Patented July 19, 1932

1,868,414

UNITED STATES PATENT OFFICE

EUGEN ASSAR ALEXIS GRÖNWALL, OF STOCKHOLM, SWEDEN

METHOD OF RECOVERING COBALT

No Drawing. Application filed January 6, 1931, Serial No. 507,039, and in Sweden September 17, 1929.

The present invention has for its object a method of recovering cobalt from copper sulphide ores containing small quantities of cobalt. The characteristic feature of the invention consists in this that the sulphide ore, with or without preliminary roasting, is melted, whereafter the copper-matte formed is treated according to the Bessemer process. The Bessemer blowing is continued until the cobalt or cobalt sulphide to the greatest part has gone over into the slag, whereafter the slag obtained in this way called "Bessemer" slag is further treated for recovering cobalt compounds or cobalt metal.

The melting of the roasted ore may be executed as well in a shaft furnace as in a reverberatory furnace. The melting in a reverberatory furnace, however, offers in this case considerable advantages over the melting in a shaft furnace, as the risk for slagging of the small cobalt quantities contained in the ore is less in melting in reverberatory furnace.

In order to concentrate the cobalt in one part of the Bessemer slag one may proceed in such a manner, that the blowing is continued in the ordinary way as long as principally only iron is oxidized. Thereafter the slag, which has been formed, and which only contains small quantities of cobalt, is tapped off. The blowing is then continued until all or the greatest part of the cobalt has been slagged. The Bessemer slag obtained at the last mentioned blowing, which thus contains the greater quantity of the cobalt, is thereafter exposed to further treatment.

The slag obtained in the said manner from the Bessemer process may be treated in several ways for concentrating or recovering the cobalt compounds or the cobalt metal.

The most convenient manner consists in exposing the Bessemer slag to a reducing melting in the presence of sulphur or any sulphur containing substance in order to transform the cobalt into sulphide. The method of smelting the slag together with for instance iron sulphide which method is generally applied for transforming oxidized copper into copper sulphide, gives in this case a bad result. A great part of the cobalt continuously remains in the slag. If it shall be possible to quantitatively extract the cobalt it has been found that the smelting must take place in a reducing atmosphere generated by the addition of carbonaceous material.

This smelting of the Bessemer slag is preferably executed in a shaft furnace, which is charged with slag and coke or other carbonaceous material and a sulphur containing material, said charge being molten in the same manner as ordinary copper-matte. Instead of a shaft furnace an electric furnace may also be used.

As suitable sulphur containing materials may be mentioned sulphides, sulphites or sulphates. Very good results have been obtained by using alkali sulphates, such as sodium sulphate or earth alkali sulphates, such as calcium or barium sulphate. Sulphides, such as iron sulphide, may also be used, but alkali or earth alkali sulphides are the best ones. The alkali and earth alkali sulphides act at the same time as strong reducing agents, wherefore it is not always required to add carbonaceous material or other reducing agent when these sulphides are used.

The product resulting after the said reducing melting of the Bessemer slag and which besides cobalt contains copper, iron, noble metals etc. is further treated preferably by being roasted, whereupon the roasted product is lixiviated by an acid. If wanted chlorinizing or sulphatizing roasting may be applied either directly on the product or after the same has been preliminarily roasted so as to remove one part of its sulphur.

The following is an example of one manner of treating the Bessemer slag.

The product resulting after the reducing smelting of the Bessemer slag is crushed and exposed to chlorinizing roasting. Then the roasted product is lixiviated by means of diluted sulphuric acid obtained by absorbing the roast-gases in water. The solid residue resulting after the lixiviation and containing amongst other things a great part of the gold, if such was present in the matte, is again introduced into the melting process. The acid solution obtained which besides cobalt contains amongst other things copper and iron is then treated with hydrogen sulphide. Thereby copper and silver (if present) are precipitated as sulphides and separated. In the solution there are now of heavy metals left principally cobalt and iron. By oxidizing the solution by means of an oxidizing agent, such as calcium hypochlorite the iron is transformed into three-valent iron compounds and is then precipitated with calcium or sodium carbonate. The only heavy metal being then left is cobalt which can be precipitated by suitable means.

The copper sulphide resulting from this treatment is—together with silver sulphide, if such be present—again introduced into the smelting process.

The cobalt in small quantities, generally 1% or some tenths of one per cent, is often contained in copper ores. Hitherto, however, no process has been known for economically recovering this cobalt. By the present invention, however, it is rendered possible, at the same time as the ore is treated for recovering copper and other metals to obtain cobalt as a by-product without the process for recovering copper being made much more expensive.

I claim:

1. Method of recovering cobalt from cobalt containing copper sulphide ores, comprising roasting the sulphide ore, smelting the roasted ore, treating the matte thereby formed according to the Bessemer process and continuing the blowing until the greatest part of the cobalt content has been oxidized and in the form of cobalt oxide gone over into the slag, called Bessemer slag, melting the Bessemer slag in the presence of reducing agents and sulphur containing materials so as to transform the cobalt oxide into cobalt sulphide and recovering cobalt from said cobalt sulphide.

2. Method of recovering cobalt from cobalt containing copper sulphide ores, comprising roasting the sulphide ore in a reverberatory furnace, smelting the roasted ore, treating the matte thereby formed according to the Bessemer process and continuing the blowing until the greatest part of the cobalt content has been oxidized and in the form of cobalt oxide gone over into the Bessemer-slag, melting the Bessemer slag in a shaft furnace in the presence of carbonaceous agents and sulphur containing materials so as to transform the cobalt oxide into cobalt sulphide, and recovering cobalt from said cobalt sulphide.

3. Method of recovering cobalt from cobalt containing copper sulphide ores, comprising roasting the sulphide ore in a reverberatory furnace, smelting the roasted ore, exposing the matte thereby formed to Bessemer-blowing as long as substantially only iron is oxidized, tapping off the slag then formed, continuing the blowing until the greatest part of the cobalt has gone over into so-called Bessemer slag, melting the Bessemer slag in a shaft furnace in the presence of sulphur containing compounds of alkali metals so as to transform the cobalt oxide into cobalt sulphide, and recovering cobalt from said cobalt sulphide.

In testimony whereof I have hereunto affixed my signature.

EUGEN ASSAR ALEXIS GRÖNWALL.